Feb. 28, 1950
E. M. PETERSON
2,498,823
GAUGE FOR OIL BURNERS
Filed July 31, 1947
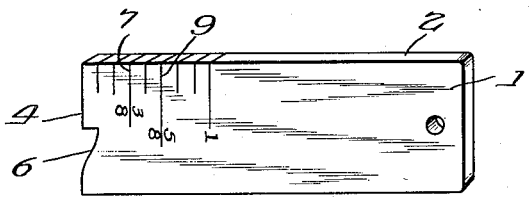
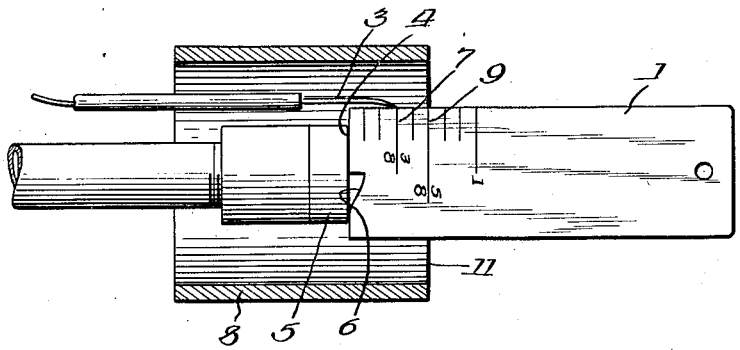
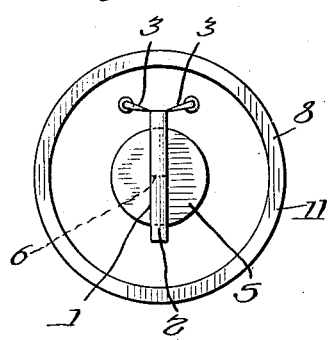
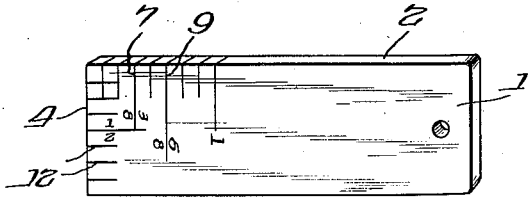
Inventor:
Edgar M. Peterson.
By: Joseph O. Lange
Atty.

Patented Feb. 28, 1950

2,498,823

UNITED STATES PATENT OFFICE 2,498,823

GAUGE FOR OIL BURNERS

Edgar M. Peterson, Chicago, Ill., assignor to Crane Co., Chicago, Ill., a corporation of Illinois Application July 31, 1947, Serial No. 765,074

1 Claim. (Cl. 33—180)

This invention relates to a measurement device for use with oil burners and more specifically it refers to a dimension gauge for oil burner nozzle adjustment whereby the latter adjustment in multiple ways can be done quickly and accurately.

It should be understood that at least three and often four or five adjustments of nozzle position and electrode position and gap are necessary in setting oil burners for best combustion. Measurement of these distances must be done in the restricted space within the oil burner sleeve on some models. Therefore an ordinary steel tape or rule cannot conveniently be used. In addition, if such a measure is used each distance must be measured and adjusted separately.

In order to acquire a further understanding of the background of this invention, it should be realized that heretofore when making adjustments for the proper spacing of the electrodes of the oil burner relative to the nozzle and also to the surrounding sleeve such measurements taken by the ordinary pocket rule have involved an objectionable degree of inaccuracy. This is particularly true because the electrodes are frequently close to a sludged or soiled portion of the nozzle and the sleeve and required several different settings of the scale or rule in order to obtain the several dimensions desired. Here in the instant contribution the adjustment gauge fits in restricted spaces, and with a single position of the gauge, establishes all measurements necessary in setting burner nozzle and electrode distances.

It should also be understood that these measurements are frequently critical and determine definitely whether or not the operation of the burner will be satisfactory for the installation. Such adjustment varies with the type of burner installed.

Therefore it is one of the more important objects of this invention to provide a dimension gauge which is relatively simple, accurate and easy to apply with a minimum of physical handling by the user.

Another object is to provide a gauge in which extreme accuracy is assured and which is sufficiently flexible to suit several varieties of oil burner nozzles, sleeves and electrodes of the respective manufacturers.

Other objects and advantages will become apparent upon proceeding with the drawings read in light of the accompanying specification in which:

Fig. 1 is a perspective view of a preferred form of gauge.

Fig. 2 is a side view of the gauge application.

Fig. 3 is an end view showing a preferred form of gauge in use.

Fig. 4 is a perspective view of a modified form of gauge.

Similar reference characters apply to similar parts throughout the several views.

Directing attention now to Fig. 1, the gauge of preferred form is made in a simple rectangular configuration preferably of sheet metal or a non-metallic composition. The selection of sheet metal or plate material for forming the gauge is preferably based upon employing a thickness as indicated at 2. The thickness of the sheet serves as a gauge whereby the spaced apart dimensions of the end points of electrodes 3 may be easily determined by placement therebetween while at the same time positioning the end 4 of the gauge against the end of the nozzle 5. The usual center tiny outlet of the nozzle is easily located by a notched or cut-away portion 6 applied to the end of the gauge whereby the outlet opening of the nozzle is accurately determined relatively by alignment of the notch therewith. At the same time the cross markings generally designated 7 on the gauge indicate the preferred dimensional projection of the electrode end points 3 beyond the end of the nozzle 5. In the usual oil burner installation and preferably positioned over the end of the nozzle and the electrodes as illustrated in Fig. 2, is a cylindrical sleeve 8 located to form an annular chamber and to permit the proper amount of air to be consumed during the course of normal combustion. The extension of the sleeve beyond the end of the nozzle 5 and the terminal points of the electrodes 3 is important dimensionally and this is determined by the markings at 9 which measure the end of the sleeve 11 relatively as mentioned.

As shown more clearly in Fig. 3 by the insertion of the gauge between the projecting points of the electrodes it is simple to measure quickly the distance therebetween. It should accordingly be obvious that by a single setting of the novel gauge forming my invention, four dimensions can actually be taken simultaneously, or at a single setting. So far as I am aware no gauge previously has been in a position to do this and still provide the accuracy referred to.

Referring now to Fig. 4 showing a modified form of gauge, the end 4 of the gauge may be made without the notch 6 by simply having a plain end employing instead the markings as indicated at 12 which may also be used to measure the relative nozzle outlet position. In other respects, modified the gauge is used in the same manner as described in connection with Figs. 1, 2 and 3 showing a preferred form of construction.

It should be clear that the particular arrangement of marking or the notches used may vary depending upon the type of burner actually being measured and therefore it is the intention not to be limited beyond the scope of the appended claim.

I claim:

In a measuring rule for determining simultaneously a plurality of dimensions on an oil burner nozzle and its related parts such as the length and spacing of the burner electrodes and the projections of the air chamber sleeve beyond the electrodes, the said measuring rule consisting of a substantially rectangular plate having straight edges at right angles to each other, the thickness of the said plate-like member being substantially equal to the desired space between the tips of the electrodes of the burner nozzle, the said plate-like member having on at least one of its longitudinal edges a series of graduations to measure the distance the tips of the electrodes extend beyond the end of the nozzle and also having on the said longitudinal edge an extension of the said series of graduations to measure the projection of the air chamber sleeve respectively beyond the end of the nozzle and the tips of the electrodes, the said plate-like member having a transverse end surface, the said latter surface being notched or cut-away, the latter notch having a longitudinally extending edge perpendicular to the said transverse end surface and having an edge lying in the same plane as the transverse end surface of the plate-like member to bear against an end surface portion of the nozzle, whereby the location of the outlet aperture of the oil burner nozzle at its end limit relative to the electrode tips is established by visual determination of the alignment of the longitudinally extending edge of the notch with the outlet aperture of the burner nozzle.

EDGAR M. PETERSON.

REFERENCES CITED

The following references are of record in the file of this patent:

UNITED STATES PATENTS

| Number | Name | Date |
|---|---|---|
| 282,931 | See | Aug. 7, 1883 |
| 325,096 | Leighton et al. | Aug. 25, 1885 |
| 371,741 | Darling | Oct. 18, 1887 |
| 697,701 | Ayer | Apr. 15, 1902 |
| 706,242 | Latshaw | Aug. 5, 1902 |
| 987,703 | Curtin | Mar. 28, 1911 |
| 1,105,809 | McAll | Aug. 4, 1914 |
| 1,877,341 | Kurtz, Jr. | Sept. 13, 1932 |